(12) United States Patent
Govekar et al.

(10) Patent No.: US 7,254,954 B2
(45) Date of Patent: Aug. 14, 2007

(54) REFRIGERANT CHARGING SYSTEM AND METHOD USING CARTRIDGES AND SCALE

(75) Inventors: Craig F. Govekar, Gurnee, IL (US); Anwar Suharno, Barrington, IL (US)

(73) Assignee: Snap-On Incorporated, Pleasant Prairie, WI (US)

( * ) Notice: Subject to any disclaimer, the term of this patent is extended or adjusted under 35 U.S.C. 154(b) by 168 days.

(21) Appl. No.: 11/113,047

(22) Filed: Apr. 25, 2005

(65) Prior Publication Data

US 2006/0236705 A1    Oct. 26, 2006

(51) Int. Cl.
*F25B 45/00*    (2006.01)
(52) U.S. Cl. ............................... 62/77; 62/149; 62/292
(58) Field of Classification Search .................. 62/77, 62/127, 149, 292; 137/116.3; 117/71
See application file for complete search history.

(56) References Cited

U.S. PATENT DOCUMENTS

| | | | | |
|---|---|---|---|---|
| 4,261,178 A | * | 4/1981 | Cain | 62/149 |
| 4,470,265 A | | 9/1984 | Correia | |
| 4,768,347 A | * | 9/1988 | Manz et al. | 62/149 |
| 4,909,042 A | * | 3/1990 | Proctor et al. | 62/149 |
| 5,046,322 A | * | 9/1991 | Bulla et al. | 62/126 |
| 5,172,562 A | * | 12/1992 | Manz et al. | 62/149 |
| 5,249,434 A | * | 10/1993 | Abraham | 62/292 |
| 5,557,940 A | * | 9/1996 | Hendricks | 62/149 |
| 5,758,506 A | * | 6/1998 | Hancock et al. | 62/77 |
| 6,434,953 B2 | * | 8/2002 | Bimboes et al. | 62/77 |
| 6,446,453 B1 | * | 9/2002 | Trachtenberg | 62/292 |
| 6,952,931 B2 | * | 10/2005 | Beatenbough et al. | 62/149 |
| 7,086,237 B2 | * | 8/2006 | Arshansky et al. | 62/77 |
| 7,104,075 B2 | * | 9/2006 | Meeker | 62/77 |

FOREIGN PATENT DOCUMENTS

| | | | |
|---|---|---|---|
| DE | 38 00 055 A1 | | 7/1988 |
| JP | 05093560 A | * | 4/1993 |
| WO | WO 03/089853 A1 | | 10/2003 |
| WO | WO 2006/019527 A1 | | 2/2006 |

* cited by examiner

*Primary Examiner*—Mohammad M. Ali
(74) *Attorney, Agent, or Firm*—McDermott Will & Emery LLP

(57) ABSTRACT

A refrigerant charging system and method for charging a refrigeration system with refrigerant includes a refrigerant source, one or more cartridges, an input line, an output line, and a scale preferably having an accuracy within about ±0.2 ounce. The cartridge is filled with refrigerant by transferring the refrigerant from the refrigerant source to the cartridge, after which, the filled cartridge is disconnected from the refrigerant source. An initial weight of the filled cartridge is obtained, and the cartridge is connected to the refrigeration system. Refrigerant is then transferred from the filled cartridge to the refrigeration system. A revised weight of the filled cartridge is obtained, and the revised weight is compared to the initial weight to determine if the refrigeration system has been completely charged. The cartridge is disconnected from the refrigeration system after the refrigeration system has been completely charged.

10 Claims, 2 Drawing Sheets

REFRIGERANT CHARGING SYSTEM AND METHOD USING CARTRIDGES AND SCALE

TECHNICAL FIELD

The disclosure relates generally to refrigerant charging systems and, more specifically, to a portable high precision refrigerant charging system.

BACKGROUND ART

Most refrigeration systems are not 100% free of leaks. Thus, the amount (or mass) of refrigerant within the refrigeration system decreases over time. Refrigeration systems, however, are designed to operate with a specific amount of refrigerant. Therefore, loss of refrigerant in a refrigeration system over time typically reduces the efficiency of the refrigeration system. Also, if the amount of refrigerant in the refrigeration system drops to a certain level, the refrigeration system may cease to operate and/or be damaged. For these reasons, a common maintenance operation for a refrigeration system is to recharge the refrigerant.

The recharging operation typically involves flushing the refrigeration system of any remaining refrigerant and, if present, other materials within the refrigeration system. Once the refrigeration system is flushed, a predetermined amount of new refrigerant is introduced into the refrigeration system. An important component of conventional refrigeration charging systems is the device that measures the amount of refrigerant introduced into the refrigeration system. Since the refrigeration system is designed to operate with a specific amount of refrigerant, too little or too much refrigerant can reduce the effectiveness of the recharging operation.

One conventional device used to measure the amount of refrigerant introduced into the refrigeration system is a load cell (or scale). Essentially, the scale measures the weight of a tank containing the refrigerant before the refrigerant is introduced into the refrigeration system and then afterwards. The difference between the two readings is the amount of refrigerant introduced into the refrigeration system. However, problems exist with the use of a scale in conventional recharging systems.

For example, scale accuracy is dependent upon the weight being measured, and a larger weight to be measured results in less accuracy. Since the scale also measures the weight of the entire tank, sensitivity of the scale is reduced. Furthermore, recent advances in refrigeration technology employ carbon dioxide as the refrigerant, which is stored at a pressure as much as ten times higher than the pressure at which conventional refrigerants are stored, and the resulting increase in storage pressure necessitates thicker walls for the tank. These thicker walls add additional weight to the tank, which further decreases the sensitivity of the scale.

Another conventional device used to measure the amount of refrigerant introduced into the refrigeration system employs mass flow technology. As recognized by those skilled in the art, mass flow technology implements a sensor that measures the flow rate of fluid (i.e., the refrigerant) flowing past a certain point. However, use of mass flow technology is very expensive, and the expense is even greater when an increased sensitivity for calculating the amount of refrigerant delivered is desired. The accuracy of mass flow technology is dependent on the fluid state since the mass flow sensors do not measure gas as well as liquid. Although most refrigerants are in a liquid form during the recharging operation, carbon dioxide is in a gaseous state during a recharging operation. Also, mass flow technology does not work well with two-phase fluids. There is, therefore, a need for a refrigerant charging system and method that is more accurate and less expensive than conventional refrigeration charging systems, particularly when the refrigerant is carbon dioxide.

SUMMARY OF THE DISCLOSURE

Described is a system for charging a refrigeration system with refrigerant. The charging system includes a refrigerant source, one or more cartridges, an input line, an output line, and a scale. The input line connects the refrigerant source to the cartridge through a valve. The scale measures the weight of the cartridge, and the scale has an accuracy within about ±0.2 ounce. The refrigerant preferably is carbon dioxide.

The cartridge is filled with refrigerant by transferring the refrigerant from the refrigerant source to the cartridge, after which, the filled cartridge is disconnected from the refrigerant source. An initial weight of the filled cartridge is obtained, and the cartridge is connected to the refrigeration system using the output line. Refrigerant is then transferred from the filled cartridge to the refrigeration system. A revised weight of the filled cartridge is obtained, and the revised weight is compared to the initial weight to determine if the refrigeration system has been charged. The cartridge is disconnected from the refrigeration system after the refrigeration system has been charged. By using the cartridge, the total weight measured by the scale is reduced. This allows for scale to have an increased accuracy, which increases the accuracy in filling the refrigeration system with refrigerant.

Additional advantages will become readily apparent to those skilled in the art from the following detailed description, wherein only an exemplary embodiment of the present invention is shown and described, simply by way of illustration of the best mode contemplated for carrying out the present invention. As will be realized, the disclosure is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENTS

Figure 1:
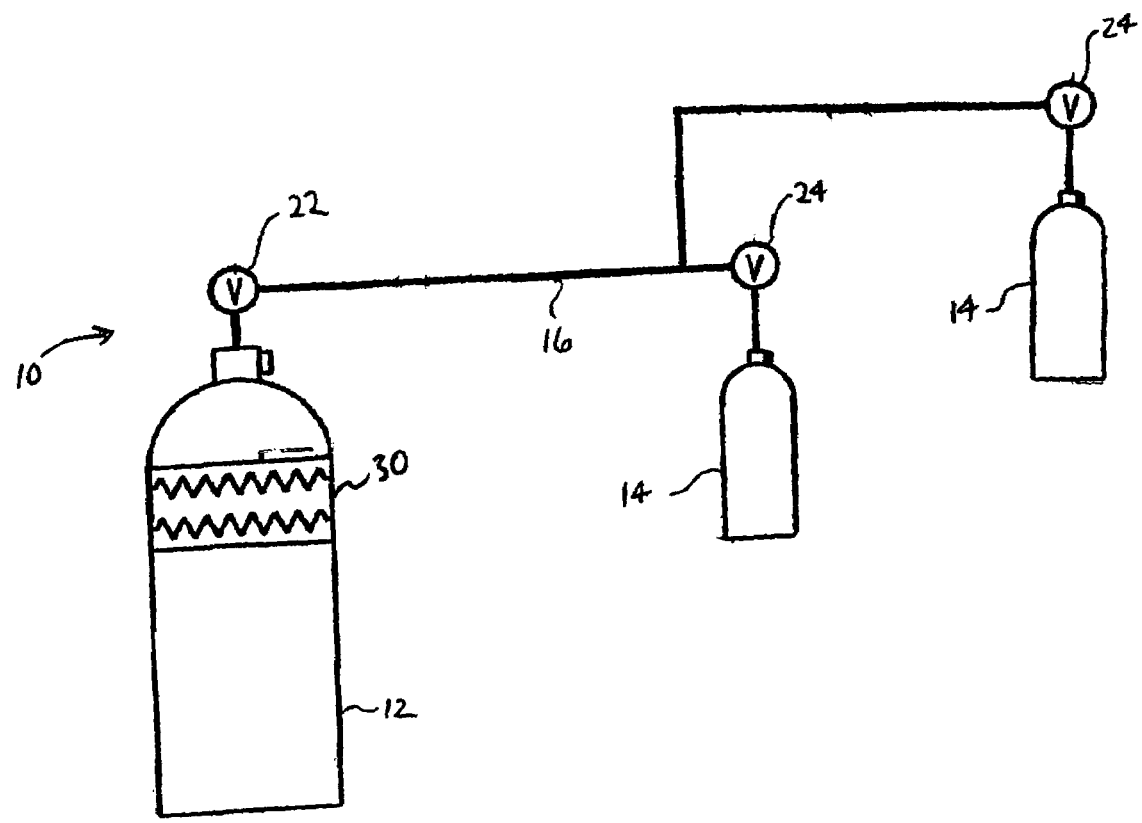
FIGS. 1 and 2 are schematic views of a refrigerant charging system, according to the disclosure.
Figure 2:
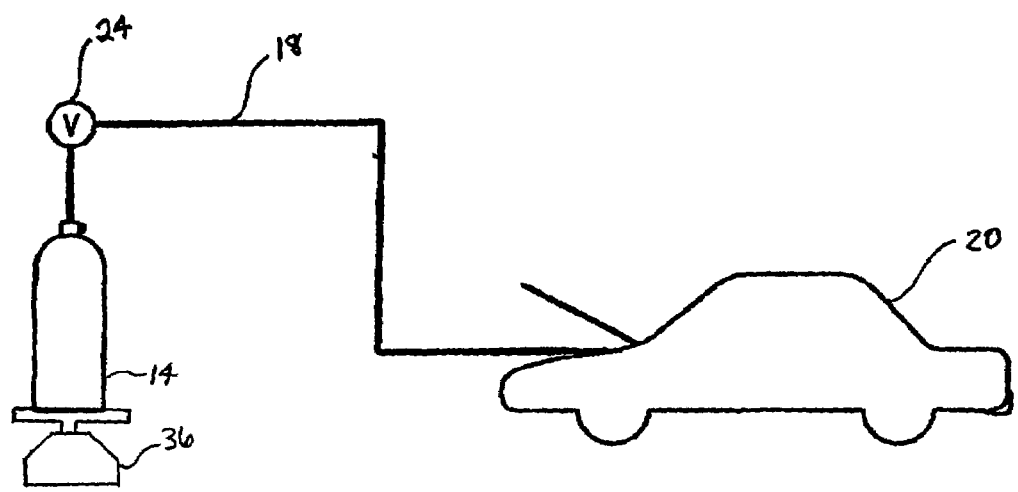

An example of a refrigerant charging system 10 is illustrated in FIGS. 1 and 2. The refrigerant charging system includes a refrigerant source 12, one or more cartridges 14, an input line 16, and an output line 18. The input line 16 fluidly connects the refrigerant source 12 to the cartridge or cartridges 14, and the refrigerant source 12 may include a source control valve 22 for controlling the flow of refrigerant from the refrigerant source 12 to the input line 16. The output line 18 fluidly connects a cartridge 14 to a refrigeration system (not shown) to be charged of a vehicle 20. Carbon dioxide is an example of a vapor refrigerant to be used in the charging system 10 described above and the method described below. It should be noted, however, that other types of refrigerant may be used with the present charging system 10 and method.

The refrigerant source 12 is not limited as to a particular type of source for providing refrigerant. However, in a current aspect of the refrigerant charging system 10, the refrigerant source 12 is a constant-volume tank. The tank 12 of refrigerant may also include a heater 30 for adjusting the temperature of refrigerant within the tank 12. The use of a heater 30 to adjust the temperature of a fluid within a tank is well known in the art, and the present refrigerant charging system 10 is not limited as to any particular type or configuration of heater 30.

The cartridge 14 may include a cartridge control valve 24 for controlling flow of refrigerant to the cartridge 14 from the input line 16 or the flow of refrigerant from the cartridge 14 to the refrigeration system of the vehicle 20. The cartridge 14 is not limited as to a particular size. However, reducing the size of the cartridge 14 enables the cartridge 14 to be readily handled by a single operator without lifting assistance, and this allows the operator greater flexibility in using the cartridge 14 to charge the refrigeration system of the vehicle.

The method and system of charging the refrigeration system involves using a scale/load cell 36. The scale 36 is used to measure the weight of the cartridges 14 before, during, and after charging the refrigerant system of the vehicle 20 with refrigerant. The scale 36 of the current refrigerant charging system 10 is sized to measure the weight of only the cartridge 14 instead of the refrigerant source 12 as in conventional systems.

The previously described scales in conventional systems are sized to measure the weight of an entire tank of refrigerant, which is comparable to the refrigerant source 12 of the present charging system 10. Since the weight of an entire tank of refrigerant is considerably greater than the weight of an individual cartridge, the previously implemented scales must be capable of measuring much greater weights. When the weight to be measured by a particular scale increases, the sensitivity of the scale decreases. This weight issue is exacerbated when carbon dioxide is the refrigerant being stored, since carbon dioxide is stored at a much greater pressure than typical refrigerant and thus, requires a much stronger (i.e., heavier) storage vessel.

By using a cartridge 14 to directly fill the refrigeration system of the vehicle 20, the weight capacity of the scale 36 of the present charging system 10 can be reduced. This reduction in weight capacity of the scale 36 allows for a greater sensitivity in the weight measured by the scale 36, which is greater than the sensitivity of the previously implemented scales. For example, the scale 36 used to measure the weight of the cartridge 14 may have an accuracy approaching ±0.2 ounce (5.7 grams) or better, whereas prior scales have an accuracy of about ±0.5 ounce (14.2 grams).

Figure 3:
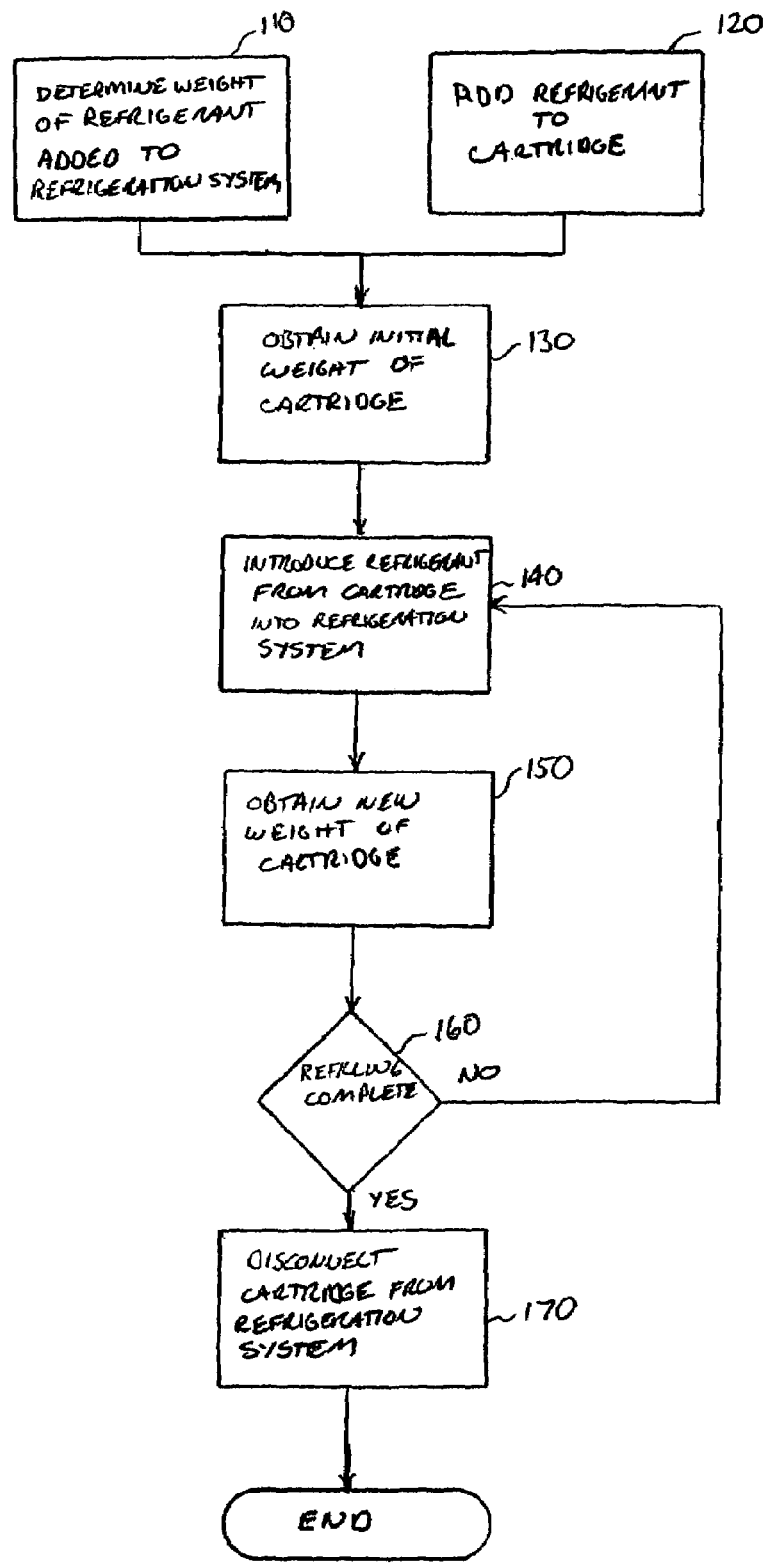
FIG. 3 is a flow chart of a method of charging a refrigeration system, according to the disclosure.

The operation of the refrigerant charging system 10 is schematically illustrated in the flow chart of FIG. 3. In an initial step 110, a required amount (mass) of refrigerant to be charged into the refrigeration system of the vehicle is determined. Many techniques of determining the mass of refrigerant to be introduced into a refrigeration system are well known in the art, and the present methodology of charging a refrigeration system is not limited to any particular technique. For example, after flushing the refrigeration system of any remaining refrigerant, which may involve discharging any remaining refrigerant and pulling a vacuum within the refrigeration system, the mass of new refrigerant to be introduced into the refrigeration system can be predefined by the manufacturer of the refrigeration system.

In step 120, refrigerant is added to the cartridge 14 from the refrigerant source 12. After the cartridge 14 has been isolated, for example, by disconnecting the cartridge 14 from the input line 16, the cartridge is connected to the refrigeration system of the vehicle 20. In step 130, an initial weight of the cartridge 14 is determined using the scale 36.

In step 140, a mass of refrigerant is introduced from the cartridge 14 into the refrigeration system of the vehicle 20 via the output line 18 by opening the cartridge control valve 24. During the introduction of refrigerant from the cartridge 14 into the refrigeration system of the vehicle 20, in step 150, the weight of the cartridge 14 is measured again using the scale 36.

In step 160, the newly measured weight of the cartridge 14 is then compared to the initial weight of the cartridge 14 to determine the amount of refrigerant that has been added to the refrigeration system of the vehicle 20. When the actual weight of refrigerant added (initial weight of cartridge 14 minus measured weight of cartridge 14) equals the desired weight of the refrigerant to be added to the vehicle 20, in step 170, the cartridge 14 is disconnected from the refrigeration system of the vehicle 20, and the entire process may be repeated to charge a refrigeration system of another vehicle 20. If, after comparing the initial weight of the cartridge 14 to the measured weight of the cartridge 14, the desired weight of refrigerant has not been added from the cartridge 14 to the refrigeration system of the vehicle 20, steps 140, 150, and 160 are repeated.

Since the present refrigerant charging system can function without mass flow technology, the system is less expensive. Also, because the present refrigerant charging system employs a scale having a reduced capacity, the sensitivity/accuracy of the scale can be increased, which allows for a greater accuracy in charging the refrigeration system with refrigerant.

The disclosed concepts may be practiced by employing conventional methodology and equipment. Accordingly, the details of such equipment and methodology are not set forth herein in detail. In the previous descriptions, numerous specific details are set forth, such as specific formulas, processes, techniques, etc., in order to provide a thorough understanding of the present invention. However, it should be recognized that the present invention may be practiced without resorting to the details specifically set forth.

Only an exemplary aspect of the present disclosure and but a few examples of its versatility are shown and described. It is to be understood that the present invention is capable of use in various other combinations and environments and is capable of changes or modifications within the scope of the inventive concept as expressed herein.

What is claimed is:

1. A method of charging a refrigeration system with refrigerant, comprising the steps of:

determining a mass of refrigerant for charging the refrigeration system;

filling a cartridge with the refrigerant by transferring the refrigerant from a refrigerant source to the cartridge;

disconnecting the filled cartridge from the refrigerant source;

obtaining an initial weight of the filled cartridge after the filled cartridge has been disconnected from the refrigerant source;

connecting the filled cartridge to the refrigeration system after disconnecting the filled cartridge from the refrigerant source;

transferring refrigerant from the filled cartridge to the refrigeration system;

obtaining a revised weight of the filled cartridge;

comparing the initial weight to revised weight to determine if the refrigeration system has been completely charged; and disconnecting the cartridge from the refrigeration system after the refrigeration system has been charged.

2. The method according to claim 1, wherein the refrigerant is a vapor refrigerant.

3. The method according to claim 2, wherein the refrigerant is carbon dioxide.

4. The method according to claim 1, wherein the initial and revised weights are obtained using a scale.

5. The method according to claim 4, wherein the scale has an accuracy within about ±0.2 ounce.

6. The method according to claim 1, wherein refrigerant is transferred from the refrigerant source to two or more cartridges.

7. A refrigeration charging system for charging a refrigeration system with refrigerant, comprising:

a refrigerant source for storing the refrigerant;

a cartridge configured to be connected to the refrigeration system;

an input line connecting the refrigerant source to the cartridge; and a scale for measuring the weight of the cartridge after being disconnected from the input line and while connected to the refrigeration system, wherein the scale has an accuracy within about ±0.2 ounce.

8. The refrigeration charging system according to claim 7, further comprising an output line configured to connect to cartridge to the refrigeration system of the vehicle.

9. The refrigeration charging system according to claim 7, further comprising at least one valve between the refrigerant source and the one or more cartridges.

10. The refrigeration charging system according to claim 7, wherein the refrigerant is carbon dioxide.

* * * * *